(12) United States Patent
Cheng et al.

(10) Patent No.: US 6,642,973 B2
(45) Date of Patent: Nov. 4, 2003

(54) REPAIR STRUCTURE AND METHOD FOR FABRICATING THE SAME

(75) Inventors: Jia-Shyong Cheng, Taoyuan Shien (TW); Shing-Shiang Chang, Taoyuan Shien (TW)

(73) Assignee: Hannstar Display Corporation, Taipei (TW)

(*) Notice: Subject to any disclaimer, the term of this patent is extended or adjusted under 35 U.S.C. 154(b) by 165 days.

(21) Appl. No.: 09/935,101

(22) Filed: Aug. 22, 2001

(65) Prior Publication Data

US 2002/0054248 A1 May 9, 2002

(30) Foreign Application Priority Data

Nov. 6, 2000 (TW) .................................... 89123420 A

(51) Int. Cl.[7] ...................... G02F 1/1368; G02F 1/1343
(52) U.S. Cl. .............................. 349/55; 349/192
(58) Field of Search ........................... 349/42, 43, 54, 349/55, 139, 147, 187, 192; 257/59, 72, 347; 438/30

(56) References Cited

U.S. PATENT DOCUMENTS 5,062,690 A * 11/1991 Whetten .................... 349/55
5,086,347 A * 2/1992 Ukai et al. .................. 349/55
5,648,826 A * 7/1997 Song et al. .................. 349/42
6,441,401 B1 * 8/2002 Jung et al. .................. 257/72

* cited by examiner

Primary Examiner—Robert H. Kim
Assistant Examiner—Tai Duong
(74) Attorney, Agent, or Firm—Volpe & Koenig, P.C.

(57) ABSTRACT

A repair structure for repairing data lines and scan lines comprised in a thin film transistor-liquid crystal display (TFT-LCD) is provided. The repair structure includes a first conducting repair structure formed simultaneously with a gate conducting structure of the thin film transistor-liquid crystal display, an insulating layer formed on the first conducting repair structure, and a second conducting repair structure formed on the insulating layer simultaneously with a data conducting structure of the thin film transistor-liquid crystal display and connected with the data conducting structure, wherein a plurality of overlap regions having the insulating layer between the fist conducting repair structure and the second conducting repair structure are formed, wherein when the data conducting structure positioned in the overlap regions is broken, the insulating layer in the overlap regions is destroyed to make electric connection between the first conducting repair structure and the second conducting repair structure.

8 Claims, 4 Drawing Sheets

REPAIR STRUCTURE AND METHOD FOR FABRICATING THE SAME

FIELD OF THE INVENTION

The present invention relates to a repair structure, and more particularly to a repair structure for repairing data lines and scan lines comprised in a thin film transistor-liquid crystal display.

BACKGROUND OF THE INVENTION

Recently, the development of liquid crystal display (LCD) is remarkable. The working principle of the liquid crystal display is based on the phenomenon that the alignment condition of liquid crystal molecules is changed by applying an electric field to change the path of light passing through the liquid crystal molecules and the display effect of changing in light and shade is further achieved.

Please refer to FIG. 1. FIG. 1 is a schematic view showing the layout of a thin film transistor-liquid crystal display. A thin film transistor structure 10 is controlled by the scan line voltage of a gate conducting structure 11 for switching the statuses of "on" and "off". When the thin film transistor structure 10 is in the status of "on", the data line voltage of a data conducting structure 12 is applied to electrodes 14 at sides of liquid crystals for changing the alignment condition of the liquid crystals and further controlling the light transmittance of the liquid crystals. Thus, the emission intensity from a light source at the back of the liquid crystal display will be changed while the light reaches the eyes of a user for achieving the display effect of changing in light and shade. In addition, a black matrix 15 is formed simultaneously with the gate conducting structure 11 for sheltering the liquid crystals from the light which is transmitted from the control region. A storage capacitance 13 is used for reinforcing the device characteristics.

A thin film transistor-liquid crystal display is formed by fabricating the foresaid components on a display. However, the data conducting structure might be broken due to the failure in fabricating the thin film transistor-liquid crystal display by mistakes.

In order to overcome the foresaid drawback, the present invention provides a repair structure for repairing data lines and scan lines comprised in a thin film transistor-liquid crystal display.

SUMMARY OF THE INVENTION

It is an object of the present invention to provide a repair structure for repairing data lines and scan lines comprised in a thin film transistor-liquid crystal display (TFT-LCD).

In accordance with the present invention, the repair structure includes a first conducting repair structure, an insulating layer, and a second conducting repair structure.

The first conducting repair structure is formed simultaneously with a gate conducting structure of the thin film transistor-liquid crystal display.

The insulating layer is formed on the first conducting repair structure.

The second conducting repair structure is formed on the insulating layer simultaneously with a data conducting structure of the thin film transistor-liquid crystal display and connected with the data conducting structure.

Furthermore, a plurality of overlap regions having the insulating layer between the fist conducting repair structure and the second conducting repair structure are formed.

In addition, when the data conducting structure positioned in the overlap regions is broken, the insulating layer in the overlap regions is destroyed to make electric connection between the first conducting repair structure and the second conducting repair structure.

Preferably, each of the first conducting repair structure and the second conducting repair structure is made of a material selected from a group consisting of chromium, tantalum, titanium, molybdenum, aluminum, copper and the combination thereof.

In addition, the insulating layer could be a gate insulating layer of the thin film transistor-liquid crystal display, and made of a material selected from a group consisting of silicon oxide, silicon nitride, silicon oxynitride, and the combination thereof.

Preferably, the insulating layer in the overlap regions is destroyed by a laser to make the electric connection between the first conducting repair structure and the second conducting repair structure.

Moreover, the first conducting repair structure is used as a black matrix to shelter liquid crystals from light.

It is another object of the present invention to provide a method for fabricating a repair structure for repairing data lines and scan lines comprised in a thin film transistor-liquid crystal display (TFT-LCD).

In accordance with the present invention, the method includes steps of forming a first conducting repair structure simultaneously with a gate conducting structure of the thin film transistor-liquid crystal display, forming an insulating layer on the first conducting repair structure, and forming a second conducting repair structure on the insulation layer simultaneously with a data conducting structure of the thin film transistor-liquid crystal display and connecting with the data conducting structure.

Furthermore, a plurality of overlap regions having the insulating layer between the first conducting repair structure and the second conducting repair structure are formed.

In addition, when the data conducting structure positioned in the overlap regions is broken, the insulating layer in the overlap regions is destroyed to make electric connection between the first conducting repair structure and the second conducting repair structure.

Preferably, each of the first conducting repair structure and the second conducting repair structure is made of a material selected from a group consisting of chromium, tungsten molybdate, tantalum, titanium, molybdenum, aluminum, copper, and the combination thereof.

In addition, the insulating layer could be a gate insulating layer of the thin film transistor-liquid crystal display, and made of a material selected from a group consisting of silicon oxide, silicon nitride, silicon oxynitride, and the combination thereof.

Preferably, the insulating layer in the overlap regions is destroyed by a laser to make the electric connection between the first conducting repair structure and the second conducting repair structure.

Moreover, the first conducting repair structure is used as a black matrix to shelter liquid crystals from light.

The present invention may best be understood through the following descriptions with reference to the accompanying drawings, in which:

DETAILED DESCRIPTION OF THE PREFERRED EMBODIMENTS

Figure 1:
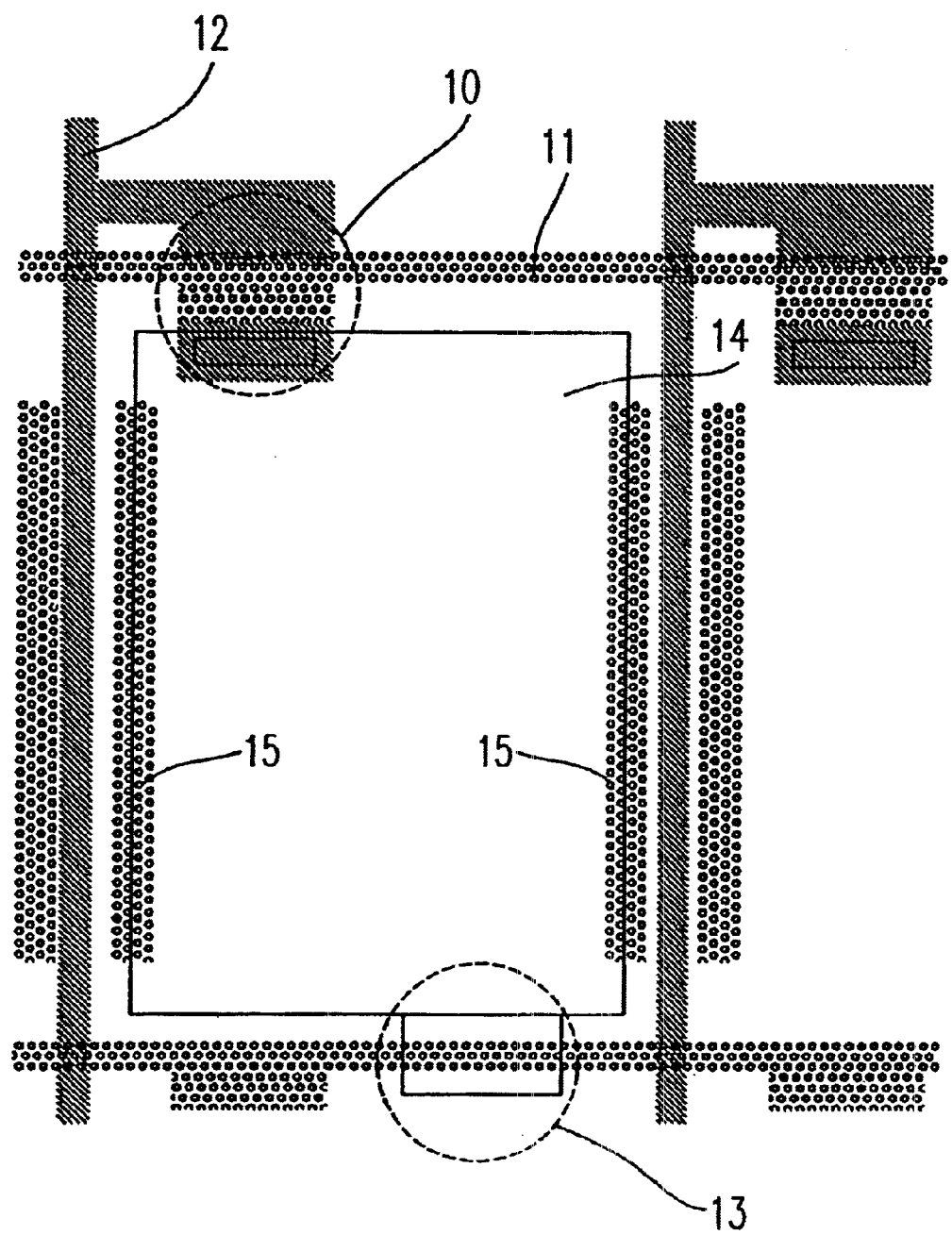
FIG. 1 is a schematic view showing the layout of a thin film transistor-liquid crystal display according to the prior art.
Figure 2A:
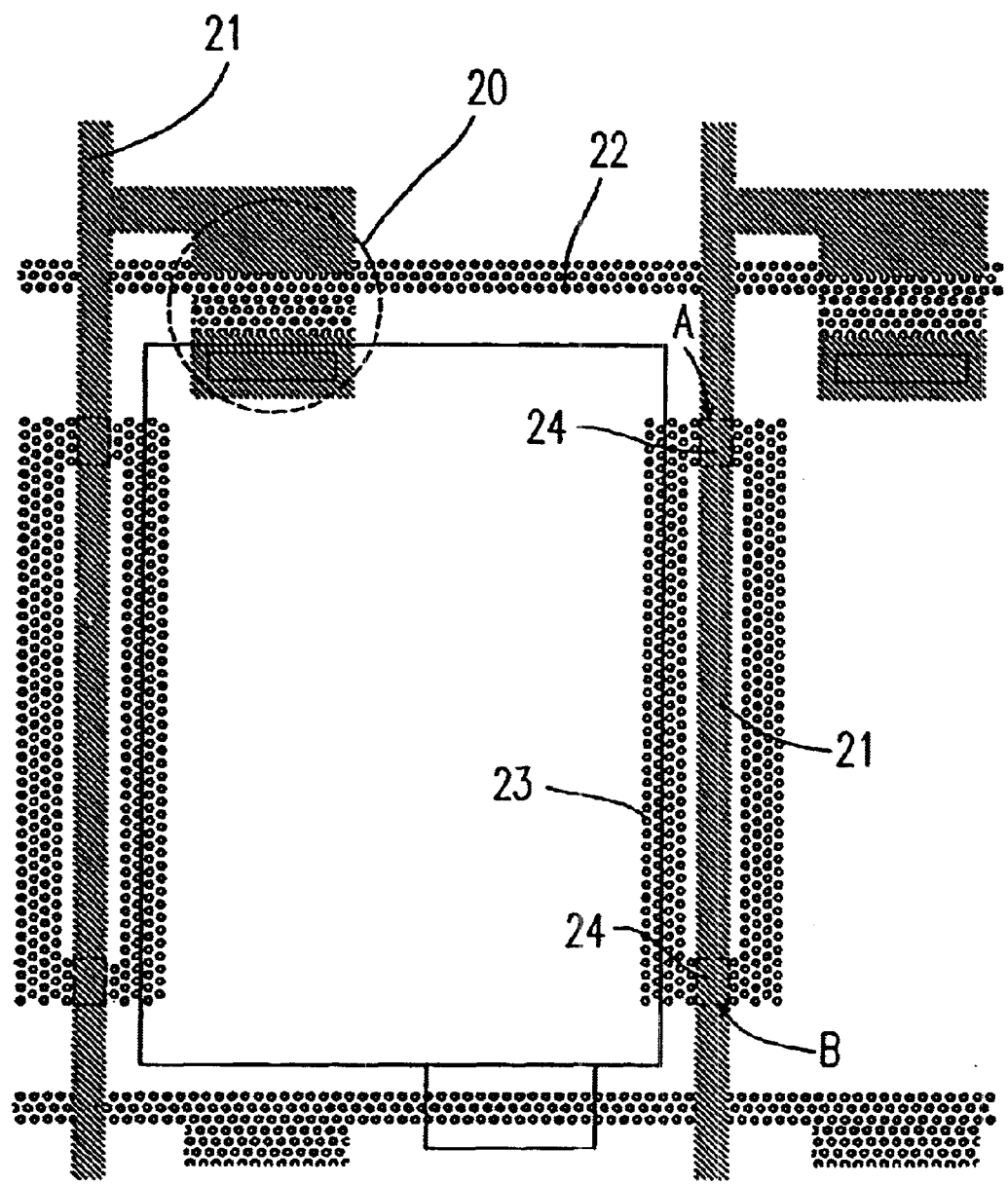
FIG. 2(a) is a schematic view showing the layout of the repair structure installed in the thin film transistor-liquid crystal display according to the preferred embodiment of the present invention.
Figure 2B:
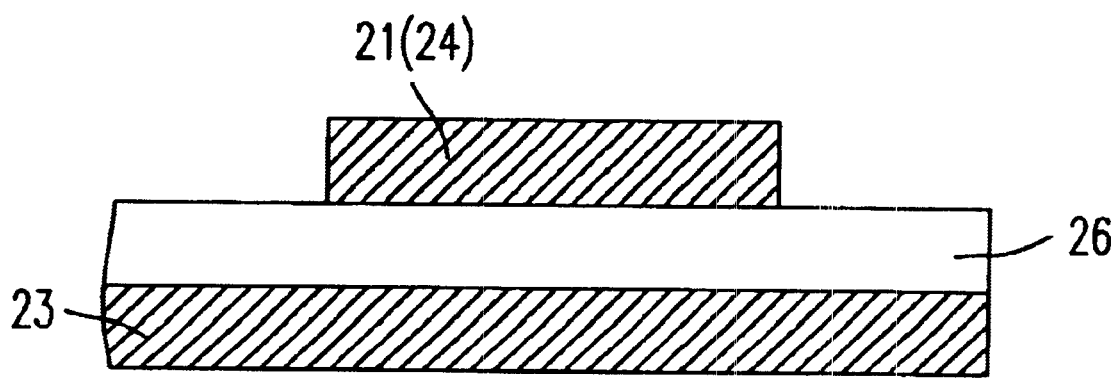
FIG. 2(b) is a sectional view showing the repair structure installed in the thin film transistor-liquid crystal display according to the preferred embodiment of the present invention.

Please refer to FIGS. 2(a) and (b). A first conducting repair structure 23 is formed simultaneously with a gate conducting structure 22 of the thin film transistor-liquid crystal display. A second conducting repair structure 24 is formed simultaneously with a data conducting structure 21 and connected with the data conducting structure 21. The overlap regions (A and B) have a gate insulating layer 26 between the first conducting repair structure 23 and the second conducting repair structure 24 as shown in FIG. 2(b). In addition, the first conducting repair structure 23 could be a black matrix for sheltering the liquid crystals from the light transmitted from the control region.

Figure 3:
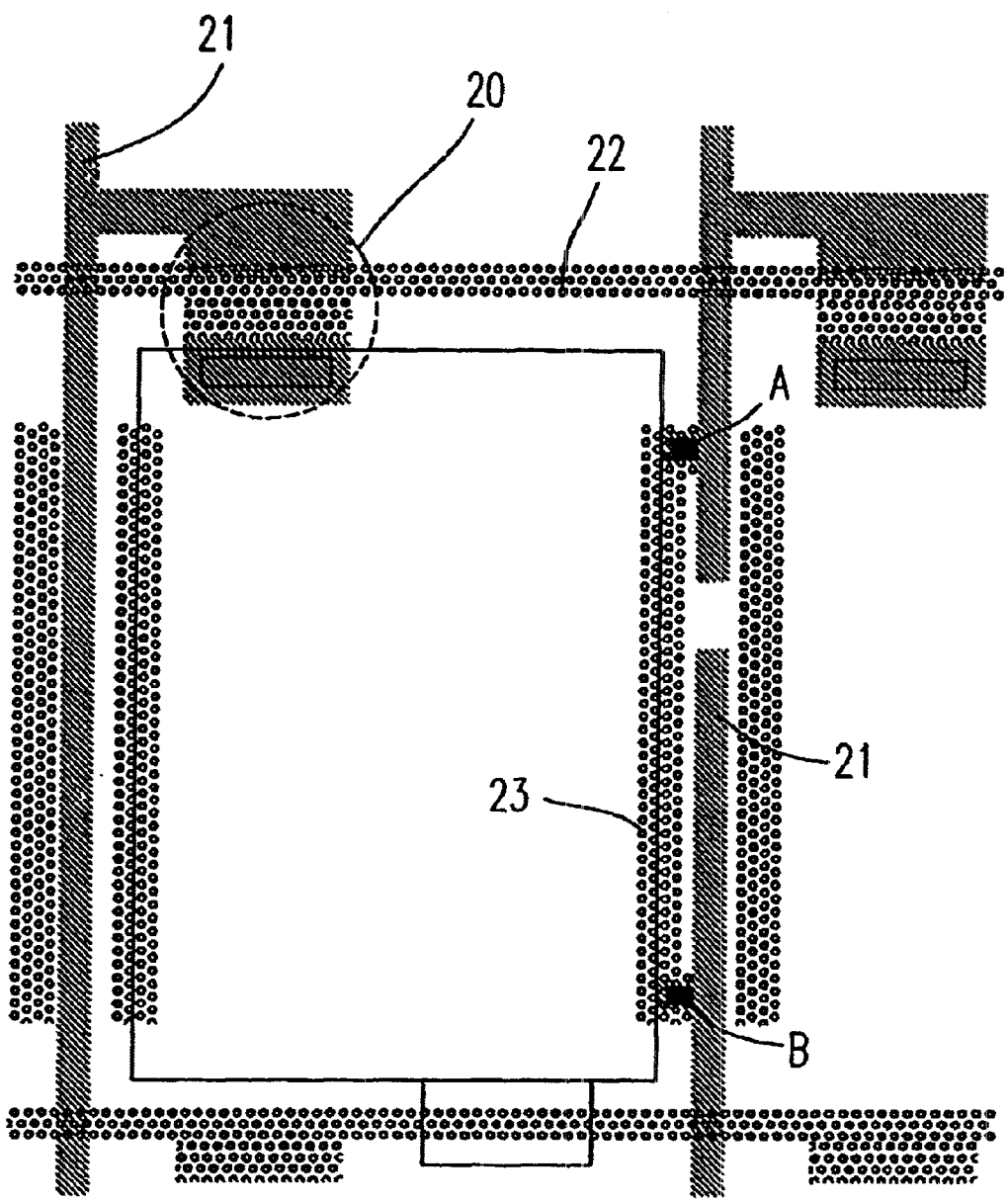
FIG. 3 is a schematic view showing the layout of the repair structure installed in the thin film transistor-liquid crystal display when the lines are broken according to the preferred embodiment of the present invention.

Please refer to FIG. 3. When the data conducting structure 21 between A and B is broken owing to some by mistakes, A and B are respectively focused by a laser to destroy the gate insulating layer 26 therein and form electrical connection between the first conducting repair structure 23 and the second conducting repair structure 24. Thus, the signals could be transmitted from the data conducting structure 21 to the second conducting repair structure 24 and further to the first conducting repair structure 21. Then, the signals could be transmitted back to the data conducting structure 21 through the second conducting repair structure 24, and the repair is completed.

Preferably, the conducting repair structures could be made of a material selected from a group consisting of chromium, tungsten molybdate, tantalum, titanium, molybdenum, aluminum, copper, and the combination thereof. The insulating layer could be made of a material selected from a group consisting of silicon oxide, silicon nitride, silicon oxynitride, and the combination thereof.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A repair structure for repairing data lines and scan lines comprised in a thin film transistor-liquid crystal display (TFT-LCD), comprising:

a first conducting structure as a first electrode of said storage capacitance;

a first conducting repair structure formed simultaneously with a gate conducting structure of said thin film transistor-liquid crystal display, wherein said first conducting repair structure is used as a black matrix to shelter liquid crystals from light;

an insulating layer formed on said first conducting repair structure; and a second conducting repair structure formed on said insulating layer simultaneously with a data conducting structure of said thin film transistor-liquid crystal display and connected with said data conducting structure, wherein a plurality of overlap regions having said insulating layer between said first conducting repair structure and said second conducting repair structure are formed, wherein an electrical connection is made between said first conducting repair structure and said second conducting repair structure if said data conducting structure positioned between said overlap regions is broken, whereby said insulating layer in said overlap regions is destroyed.

2. The repair structure according to claim 1, wherein each of said first conducting repair structure and said second conducting repair structure is made of a material selected from a group consisting of chromium, tantalum, titanium, molybdenum, aluminum, copper, and the combination thereof.

3. The repair structure according to claim 1, wherein said insulating layer is a gate insulating layer of said thin film transistor-liquid crystal display, and made of a material selected from a group consisting of silicon oxide, silicon nitride, silicon oxynitride, and the combination thereof.

4. The repair structure according to claim 1, wherein if said data conducting structure positioned between said overlap regions is broken, said insulating layer in said overlap regions is destroyed by a laser to make said electric connection between said first conducting repair structure and said second conducting repair structure.

5. A method for fabricating a repair structure for repairing data lines and scan lines comprised in a thin film transistor-liquid crystal display (TFT-LCD), comprising steps of:

forming a first conducting repair structure simultaneously with a gate conducting structure of said thin film transistor-liquid crystal display, wherein said first conducting repair structure is used as a black matrix to shelter liquid crystals from light;

forming an insulating layer on said first conducting repair structure; and forming a second conducting repair structure on said insulating layer simultaneously with a data conducting structure of said thin film transistor-liquid crystal display and connected with said data conducting structure, wherein a plurality of overlap regions having said insulation layer between said first conducting repair structure and said second conducting repair structure are formed, wherein an electrical connection is made between said first conducting repair structure and said second conducting repair structure if said data conducting structure positioned between said overlap regions is broken, whereby said insulating layer in said overlap regions is destroyed.

6. The method according to claim 5, wherein each of said first conducting repair structure and said second conducting repair structure is made of a material selected from a group consisting of chromium, tungsten molybdate, tantalum, titanium, molybdenum, aluminum, copper, and the combination thereof.

7. The method according to claim 5, wherein said insulating layer is a gate insulating layer of said thin film transistor-liquid crystal display, and made of a material selected from a group consisting of silicon oxide, silicon nitride, silicon oxynitride, and the combination thereof.

8. The method according to claim 5, wherein if said data conducting structure positioned between said overlap regions is broken, said insulating layer in said overlap regions is destroyed by a laser to make said electric connection between said first conducting repair structure and said second conducting repair structure.

* * * * *